United States Patent Office 3,829,303
Patented Aug. 13, 1974

3,829,303
DIELECTRIC PROPERTIES OF INORGANIC OXIDE GLASS-CERAMIC MATERIALS
Robert J. Zeto, Lincroft, Charles D. Bosco, Bricktown and Eugene Hryckowian, Oceanport, N.J., assignors to The United States of America, as represented by the Secretary of the Army.
No Drawing. Filed Oct. 25, 1973, Ser. No. 409,498
Int. Cl. C03b, *35/00, 3/00*
U.S. Cl. 65—32     6 Claims

ABSTRACT OF THE DISCLOSURE

The dielectric properties, particularly the dielectric constant and dielectric strength, of inorganic oxide glass-ceramic materials is improved by subjecting the materials to hot, isostatic nitrogen gas or oxygen gas pressures during crystallization.

---

This invention relates in general to a method of improving the dielectric properties of inorganic oxide glass-ceramic materials and in particular to a method of improving the dielectric properties of a lead-barium-strontium niobate glass-ceramic material.

BACKGROUND OF THE INVENTION

Organic film capacitors are used to satisfy the high energy storage requirements of certain laser equipments such as rangefinders. Organic materials generally possess high dielectric strength and low dielectric constant. The former characteristic is very favorable for energy storage, particularly at high applied voltages, whereas the low dielectric constant makes it necessary to employ a large-area, rolled dielectric layer to generate capacitance for the required energy storage. Herein lies the major disadvantage of organic film capacitors as the resultant unit does not meet the desired weight and volume requirements for certain portable laser devices.

Inorganic materials, particularly those with the perovskite structure as for example $A^{2+}B_2^{5+}O_6$, are an alternative to organic capacitor materials since the former are generally more stable to environmental conditions and possess significantly higher dielectric constant. Single crystal materials also have high dielectric strength but are expensive to prepare for use as capacitors. It is economically feasible to fabricate these materials as glass-ceramics, that is polycrystalline solids prepared by the controlled crystallization of glasses, but the resultant dielectric properties are appreciably lower than the intrinsic single crystal values, particularly in the all-important dielectric strength.

SUMMARY OF THE INVENTION

The general object of this invention is to provide a method of improving the dielectric properties of inorganic oxide glass-ceramic materials. A further object of this invention is to provide such a method that will enable the resulting material to be used as a capacitor in high energy storage applications. A specific object of the invention is to provide a method of improving the dielectric constant and dielectric strength of inorganic niobate glass-ceramic materials.

The foregoing objects have been attained by a method comprising subjecting a glass material to nitrogen gas or oxygen gas in the pressure range of about 1,500 p.s.i. to 15,000 p.s.i., at a temperature of about 25° C. to 300° C., raising the temperature at a rate of about 5 degrees C. per minute to 15 degrees C. per minute to about 725° C. to 925° C. while maintaining the gas pressure, holding the temperature and pressure constant for about ½ hour to 4 hours, reducing the temperature at about 5 degrees C. to 15 degrees C. per minute to about 25° C. to 300° C., releasing the pressure, and then removing the resulting glass-ceramic.

DESCRIPTION OF THE PREFERRED EMBODIMENT

An inorganic niobate glass is used of the following composition:

| | Weight percent |
|---|---|
| $Nb_2O_3$ | 44.7 to 48.7 |
| BaO | 12.5 to 18.9 |
| SrO | 3.9 to 16.0 |
| PbO | 13.8 to 26.5 |
| $SiO_2$ | 3.1 to 13.0 |
| $Al_2O_3$ | 1.9 to 9.2 |
| $B_2O_3$ | 0 to 2.5 |
| $GeO_2$ | 0 to 12.0 | and wherein the said oxides of silicon, aluminum, boron, and germanium amount to about 12.0 to 14.9 weight percent of the glass composition, and wherein the said oxides of barium, strontium, lead, and niobium are present in an amount of approximately the content required by the stoichiometry of the perovskite crystallized phase $$A^{2+}Nb_2^{5+}O_6$$

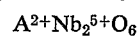

and wherein $A^{2+}$ represents the combination of divalent cations of barium, strontium and lead within the weight percent range as specified above.

The glass composition is placed in a suitable holder such as an open ended gold foil tube and then placed in a pressure vessel. The vessel is charged to a nitrogen pressure of about 3,500 p.s.i. at a temperature of about 100° C. Then, the temperature is raised at a rate of about 10 degrees C. per minute to about 875 degrees C. The pressure and temperature are then held constant for about 1¾ hours after which the temperature is reduced at about 10 degrees per minute to about 100° C. The pressure is then released and the glass-ceramic sample removed from the pressure vessel. The resulting glass-ceramic includes 70 to 80 percent by volume of a lead, barium, strontium, niobate as an oxygen-octahedral phase, the remaining volume being a dispersed silicate phase.

When the dielectric properties of the above glass-ceramic are compared to the dielectric properties of the same starting glass niobate composition crystallized under the same conditions except that room pressure air is used in place of 3,500 p.s.i. nitrogen gas, a significant improvement in dielectric properties is noted. An improvement of dielectric strength and of dielectric constant at all values of electric field strength is shown in the Table where the dielectric properties are compared at room conditions for each preparative method.

TABLE

| | Dielectric constant | |
|---|---|---|
| Electric field strength (kv./cm.) | From crystallization in room pressure air (15 p.s.i.) | From crystallization in nitrogen pressure (3,500 p.s.i.) |
| 0 | 407 | 490 |
| 200 | 168 | 205 |
| 400 | 106 | 132 |
| 483 | DBV | 117 |
| 600 | | 102 |
| 800 | | 88 |
| 978 | | DBV |

NOTE.—DBV = Dielectric breakdown voltage.

In addition to the dielectric property improvement shown in the Table, a threefold increase in stored energy density at the dielectric breakdown voltage is effected.

EXAMPLE 2

The same glass-ceramic composition is used as in the preferred embodiment and the same general method is used as in the preferred embodiment except that the temperature is raised to 825 degrees C. instead of 875 degrees C.

When the dielectric strength of the resulting glass-ceramic is compared to the dielectric strength of the same starting glass niobate composition crystallized with room pressure air, an improvement from 590 kilovolts per centimeter to about 950 kilovolts per centimeter is noted for the isostatically pressed composition. It is further noted that an approximate 60 percent improvement in stored energy density at the dielectric breakdown voltage is obtained.

EXAMPLE 3

The same glass-ceramic composition is used as in the preferred embodiment and the same general method is used as in the preferred embodiment except that the pressure vessel is charged to about 7500 p.s.i. nitrogen gas and the temperature is raised to about 825 degrees C. When the dielectric properties of the glass-ceramic are compared to the dielectric properties of the same starting glass niobate composition crystallized with room pressure air, an improvement in dielectric constant for the isostatically pressed composition at high electric field strengths is noted as for example from 70 to 85 at 500 kilovolts per centimeter. Similarly, the dielectric strength is improved from 590 to 790 kilovolts per centimeter, and the stored energy density at the dielectric breakdown voltage is improved from about 1.6 joules per cubic centimeter to about 2.6 joules per cubic centimeter.

EXAMPLE 4

The same glass-ceramic composition is used as in the preferred embodiment and the same general method is used as in the preferred embodiment except that the pressure vessel is charged to 15000 p.s.i. nitrogen gas and the temperature is raised to 825 degrees C. When the dielectric properties of the glass-ceramic are compared to the dielectric properties of the same starting glass niobate composition crystallized with room pressure air, an improvement in dielectric constant at high electric field strengths is noted for the isostatically pressed composition as for example from 70 to 85 at 500 kv./cm.

EXAMPLE 5

The same glass-ceramic composition is used as in the preferred embodiment and the same general method is used as in the preferred embodiment except that the pressure vessel is charged to 3500 p.s.i. with oxygen gas and the temperature is raised to 825 degrees C. When the dielectric properties of the isostatic pressure treated glass-ceramic are compared to the dielectric properties of the same composition crystallized with room air pressure, an improvement in dielectric strength of from 590 to 895 kilovolts per centimeter is noted for the isostatically pressed composition as well as an improvement in stored energy at dielectric breakdown of from about 1.6 joules per cubic centimeter to about 3.6 joules per cubic centimeter.

EXAMPLE 6

The same glass-ceramic composition is used as in the preferred embodiment and the same general method is used as in the preferred embodiment except that the pressure vessel is charged with oxygen to a pressure of 7500 p.s.i. and the temperature is raised to 825 degrees C. When the dielectric properties of the pressure treated glass-ceramic are compared to the dielectric properties of the same composition crystallized with room air pressure, an improvement in dielectric constant is noted for the pressurized sample. That is, at zero applied voltage, the dielectric constant increases from about 330 for the atmospheric treated sample to about 430 for the pressure treated sample. At an applied voltage of 500 kilovolts per centimeter the increase in dielectric constant is from about 70 to about 122. Similarly, the stored energy density at the dielectric breakdown voltage is improved from about 1.6 joules per cubic centimeter to about 2.7 joules per cubic centimeter.

EXAMPLE 7

The same glass-ceramic composition is used as in the preferred embodiment and the same general method is used as in the preferred embodiment except that the vessel is charged to 7500 p.s.i. with oxygen gas. When the dielectric properties of the pressure treated composition are compared to the dielectric properties of the same composition crystallized with room air pressure, an improvement of all properties is noted for the pressure treated composition. The zero voltage dielectric constant increases from about 407 to about 538; the dielectric breakdown voltage increases from about 483 to about 590; and the stored energy density at dielectric breakdown increases from about 1.4 joules per cubic centimeter to about 2.5 joules per cubic centimeter.

Various modifications of the foregoing description are considered as coming within the scope of the invention. For example, instead of the inorganic niobate glass used in the examples, one could start with other glass compositions that yield glass-ceramic materials with different crystalline phases such as $KNbO_3$ and $BaTiO_3$. The use of such materials will of course necessitate suitable adjustment of other parameters such as heating and cooling rates, crystallization pressure and temperature and time, etc.

While there has been described what is at present considered to be the preferred embodiment of this invention, it will be obvious to those skilled in the art that various changes and modifications may be made therein without departing from the invention.

What is claimed is:

1. Method of improving the dielectric properties of lead-barium-strontium niobate glass-ceramic material including the steps of
   (A) placing the inorganic niobate glass material in a suitable vessel,
   (B) charging the vessel at a temperature of about 25° C. to 300° C. with a gas selected from the group consisting of oxygen and nitrogen to a pressure of about 1500 to 15,000 pounds per square inch,
   (C) raising the temperature at a rate of about 5 to 15 degrees C. per minute to about 725 to 925 degrees C. and holding at that temperature and pressure for about ½ to 4 hours,
   (D) reducing the temperature at a rate of about 5 to 15 degrees C. per minute to about 25 to 300 degrees C., and
   (E) releating the pressure.

2. Method according to Claim 1 where the gas is nitrogen.

3. Method according to Claim 1 where the gas is oxygen.

4. Method according to Claim 1 where the lead-barium-strontium niobate glass-ceramic is of the composition:

| | Weight percent |
|---|---|
| $Nb_2O_3$ | 44.7 to 48.7 |
| $BaO$ | 12.5 to 18.9 |
| $SrO$ | 3.9 to 16.0 |
| $PbO$ | 13.8 to 26.5 |
| $SiO_2$ | 3.1 to 13.0 |
| $Al_2O_3$ | 1.9 to 9.2 |
| $B_2O_3$ | 0 to 2.5 |
| $GeO_2$ | 0 to 12.0 | and wherein the said oxides of silicon, aluminum, boron, and germanium amount to 12.0 to 14.9 weight percent of the glass composition; and wherein the said oxides of barium, strontium, lead, and niobium are present in an amount of approximately the content required by the stoichiometry of the perovskite crystallized phase $$A^{2+}Nb_2^{5+}O_6$$

wherein $A^{2+}$ represents the combination of divalent cations of barium, strontium and lead within the weight percent range as specified above.

5. Method according to Claim 4 wherein the gas is nitrogen.

6. Method according to Claim 4 wherein the gas is oxygen.

References Cited

UNITED STATES PATENTS

| | | | |
|---|---|---|---|
| 3,689,414 | 9/1972 | Watanabe et al. | 252—62.9 X |
| 3,502,598 | 3/1970 | Nitta | 252—62.9 X |
| 3,062,667 | 11/1962 | Pierrut et al. | 252—63.2 X |
| 3,420,776 | 11/1969 | Hepplewhite et al. | 252—62.9 |
| 3,615,757 | 10/1971 | Herczog | 106—52 X |

S. LEON BASHORE, Primary Examiner

F. W. MIGA, Assistant Examiner

U.S. Cl. X.R.

65—33, 134; 106—47 R, 52; 252—63.2, 62.9, 518; 264—85